United States Patent [19]

Kardos

[11] Patent Number: 4,856,558
[45] Date of Patent: Aug. 15, 1989

[54] FLAPPER CONTROL VALVE

[75] Inventor: Peter Kardos, Longmeadow, Mass.

[73] Assignee: Gas Research Institute, Chicago, Ill.

[21] Appl. No.: 229,129

[22] Filed: Aug. 5, 1988

[51] Int. Cl.⁴ .............................................. F16K 15/18
[52] U.S. Cl. ............................ 137/625.33; 137/512.1;
137/516.15; 251/82; 251/129.02; 251/285
[58] Field of Search ........... 137/512.1, 516.15, 625.33;
251/82, 129.02, 285

[56] References Cited

U.S. PATENT DOCUMENTS

| | | | |
|---|---|---|---|
| 1,102,647 | 7/1914 | Davis | 137/625.33 X |
| 1,121,969 | 12/1914 | Beling | 137/512 |
| 1,243,122 | 10/1917 | Winters | 137/625.33 X |
| 3,162,699 | 12/1964 | Sivyer | 137/512.1 X |
| 3,312,241 | 4/1967 | Bryant | 137/599 |
| 3,357,449 | 12/1967 | King | 137/512.1 |
| 3,786,834 | 1/1974 | Garland | 137/516.15 X |
| 3,853,268 | 12/1974 | Schneider | 137/625.33 X |
| 4,173,985 | 11/1979 | Kirpichenkov | 137/512.1 |
| 4,300,595 | 11/1981 | Mayer et al. | 137/625.33 |
| 4,307,751 | 12/1981 | Mayer et al. | 137/512.1 |
| 4,483,363 | 11/1984 | Madoche et al. | 137/512.1 X |
| 4,537,213 | 8/1985 | Molina | 137/269.5 |
| 4,569,208 | 2/1986 | Villa | 137/855 X |
| 4,577,661 | 3/1986 | Melrose et al. | 137/625.33 |
| 4,643,226 | 2/1987 | Balz | 137/625.33 |
| 4,687,435 | 8/1987 | Matsuzaka et al. | 137/516.15 X |
| 4,752,209 | 6/1988 | Vishwanath et al. | 431/1 |

Primary Examiner—John Rivell
Attorney, Agent, or Firm—Thomas W. Speckman; Douglas H. Pauley

[57] ABSTRACT

A flapper control valve having a valve housing and at least one valve port plate sealably secured to the valve housing. Each valve port plate has at least one valve port plate through hole. At least one back plate is mounted downstream from the valve port plate and in an open position at a distance from the valve port plate. Each back plate has at least one back plate through hole. In the open position, at least one valve port plate through hole is in communication with at least one back plate through hole. The distance between the back plate and the valve port plate in the open position can be closed thus sealing the communication between at least one valve port plate through hole and at least one back plate through hole.

10 Claims, 2 Drawing Sheets

FLAPPER CONTROL VALVE

BACKGROUND OF THE INVENTION

1. Field of the Invention

This invention relates to a flapper control valve having a valve port plate and a back plate, each with at least one through hole, which open and close relative to each other to control fluid flow through both plates.

2. Description of the Prior Art

Kirpichenkov, U.S. Pat. No. 4,173,985 teaches a straightway valve having a polyhedral body with outlet ports in seat surfaces on the sides of the polyhedral body. A working cavity is provided within the body of the valve. The cavity within the valve body has a flow splitter or divider which divides the compressed air flow through the body into several streams equal in number to that of the faces of the splitter. Airstreams reflected from the faces of the splitter are driven toward the outlet ports and the flow bends or flexes a closure plate which also bends or flexes a reed-type closing member secured to the closure plate. The '985 patent discloses a straightway valve specifically designed for use as a suction and delivery valve in cylinders for air or gas piston-type compressors.

Villa, U.S. Pat. No. 4,569,208 teaches a pressure relief port which regulates the pressure within an enclosure and a miniature pressure relief port mainly used in regulating pressure within commercial refrigeration enclosures.

Molina, U.S. Pat. No. 4,537,213 teaches a double flapper check valve having a housing divided into two chambers. A valve seat in one chamber angles upward and a valve seat in the opposite chamber angles downward. Gravity holds one flapper valve in the open position and the other flapper valve in a closed position unless the closed flapper valve is opened by a flow of fluid. Rotating the housing of the double flapper check valve 180° will reverse the position of the flapper valve so that the permitted fluid flow will be reversed.

Beling, U.S. Pat. No. 1,121,969 teaches a safety valve having a single conduit leading into a central portion of a tubular section. The tubular section has an air inlet valve on one end and a safety outlet valve on the opposite end. Both valves are spring-biased, stem-type valves. The air inlet valve is in a normally open position and the safety valve is in a normally closed position. As the pressure increases sufficiently, the safety valve opens and the air inlet valve closes.

Melrose et al, U.S. Pat. No. 4,577,661 teaches a high speed—high flow spool valve. A fast-acting high flow valve has a slotted spool in registry with a slotted sleeve providing full opening with a short valve throw. The slots in the spool and the slots in the sleeve form a mating grill-like structure. The high flow valve is operated by a linear or rotary actuator such as an electric solenoid.

Mayer et al, U.S. Pat. No. 4,300,595 teaches a solenoid control valve having a movable valve plate and a stationary valve seat situated within a passage to control the flow of fluid through the passage. The valve plate has a plurality of passages adapted to mate with a corresponding surface of the valve seat which closes the flow of fluid through the valve seat.

Bryant, U.S. Pat. No. 3,312,241 teaches a fluid control apparatus having a stationary plate with a plurality of ports and a movable plate on each the upstream and downstream side of the valve. Both the stationary plate and both movable plates have a plurality of ports or openings. The stationary plate is interposed between the two movable plates and hydraulic power actuators displace the movable plates to either provide or close communication between the ports in the movable plates and the ports in the stationary plate.

Balz, U.S. Pat. No. 4,643,226 teaches a slide gate valve having an inner chamber which accommodates a stationary valve plate. A displaceable valve plate having an annular insert, with approximately the same inside diameter as a discharge pipeline attached to the valve housing, supports the stationary valve plate. The stationary valve plate has several slots located transversely to the displacement direction of the valve plate. The displaceable valve plate also has an equal number of slots which can be brought into alignment with the slots of the stationary valve plate and thus allow fluid to flow.

SUMMARY OF THE INVENTION

It is an object of this invention to provide a flapper control valve capable of handling a wide range of flow applications.

It is another object of this invention to provide a flapper control valve which achieves a modulating capability when inputs are either increased or reduced in predetermined increments.

It is yet another object of this invention to provide a flapper control valve having multiple mechanical flapper valves mounted within a single valve housing such that only one flapper control valve size covers a wide range of flow inputs thereby reducing the cost of the flapper control valve.

It is yet another object of this invention to provide a flapper control valve having multiple mechanical flapper valves mounted within a single valve housing such that input flow rates can be substantially increased without increasing the diameter of a front port plate and a back plate. As the diameter of the front port plate and the back plate of conventional valves increase, the thickness of the plates must also increase to maintain structural integrity. Input flow rates can be increased while keeping the thickness of the front port plate and back plate constant by using multiple smaller mechanical flapper valves with smaller diameters.

It is yet another object of this invention to provide a flapper control valve having multiple mechanical flapper valves mounted within a single valve housing having only one fuel supply line or feed line to the combustion chamber, thus providing improved and uniform response to the pressure regime within the chamber.

In a preferred embodiment of this invention, a flapper control valve has a valve housing with at least one valve port plate sealably secured to the valve housing. Each valve port plate has at least one valve port plate through hole. At least one back plate is mounted downstream from the valve port plate and in an open position at a distance from the valve port plate. Each back plate has at least one back plate through hole. In the open position of the flapper control valve, at least one valve port plate through hole is in communication with at least one back plate through hole.

The distance between the back plate and the valve port plate can be decreased to form a closed position which seals the communication between each valve port plate through hole and each back plate through hole. Such closed position can be accomplished by having a plurality of pins and a plurality of ring flappers. Each pin has a back plate pin portion slidably secured within the back plate and a valve port pin portion secured to a ring flapper. In the closed position of the back plate with respect to the valve port plate, the ring flapper abuts the valve port plate and seals the valve port plate through hole.

A control rod has one end secured to the back plate. The control rod can be displaced with respect to the valve port plate and thereby abut the back plate against each ring flapper. The flapper control valve can be switched between the open position and the closed position. A valve port bushing is seated within the valve port plate. A limiting spacer abuts the valve port plate bushing. The control rod has a control rod shoulder which abuts the limiting spacer. A spring is abutted to the control rod shoulder and an actuator bracket bushing abuts the spring. An actuator bracket is abutted to the actuator bracket bushing. The actuator bracket is secured with respect to the valve port plate. An electromagnetic solenoid is secured to the actuator bracket.

DESCRIPTION OF THE PREFERRED EMBODIMENTS

Figure 1:
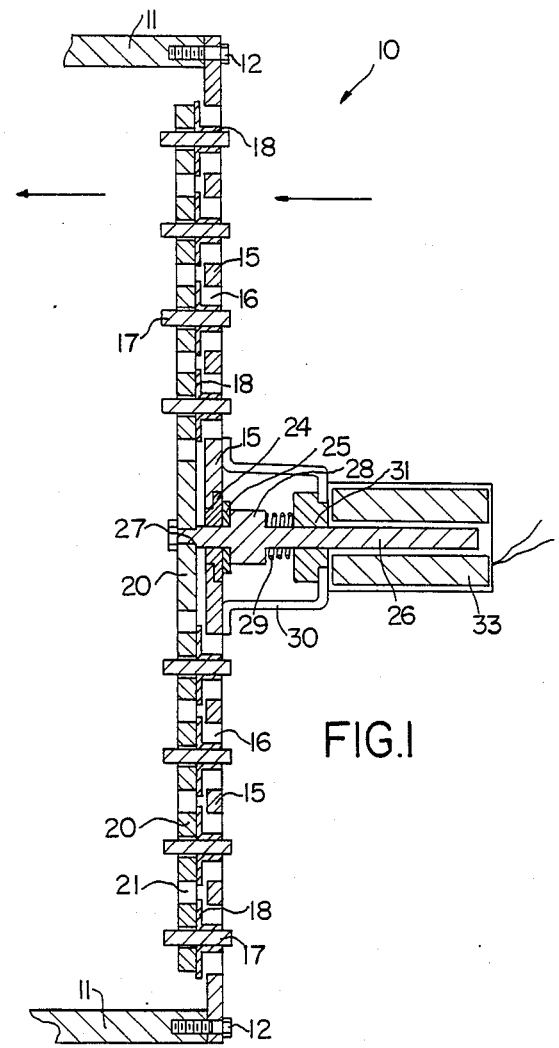
FIG. 1 shows a cross-sectional side view through the center of an open flapper control valve which acts as an intake valve according to one embodiment of this invention.

FIG. 1 shows a cross-sectional side view taken through the center of an open flapper control valve according to one embodiment of this invention. As shown in FIG. 1, flapper control valve 10 represents an intake valve where fluid flows from the outside of valve housing 11 into a chamber formed by valve housing 11 as shown by the arrows. In a preferred embodiment of this invention, valve housing screws 12 secure and seal valve port plate 15 to valve housing 11. It is apparent that valve housing 11 can have any type of configuration having at least one flat face such as a cube, any polyhedron or the like. At least one valve port plate 15 is sealably secured to valve housing 11.

Figure 2:
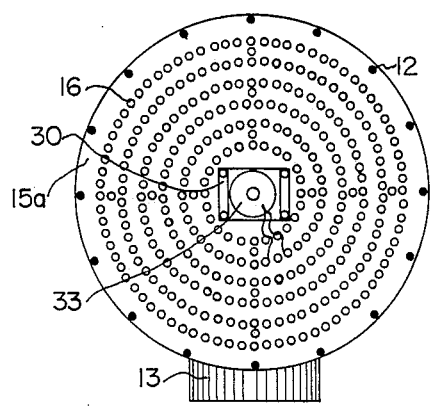
FIG. 2 shows a front view of a flapper control valve having a double valve air intake system, or two valve port plate assemblies within one housing, according to one embodiment of this invention.

Each valve port plate 15 has at least one valve port plate through hole 16, preferably a multiplicity of valve port plate through holes 16, as shown in FIG. 2. Each back plate 20 has at least one back plate through hole 21, preferably a multiplicity of back plate through holes 21.

Figure 8:
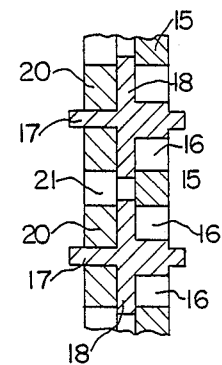
FIG. 8 shows a cross-sectional side view through the center of a section of a closed flapper control valve according to one embodiment of this invention.

As shown in FIG. 1, open flapper control valve 10 operates as an intake valve and back plate 20 is mounted downstream from valve port plate 15. It is apparent that flow through flapper control valve 10 can be opposite the flow shown in FIG. 1 thus allowing flapper control valve 10 to operate as an exhaust valve. In its mounted position, back plate 20 is in an open position at a distance from and parallel to valve port plate 15. In such open position, at least one valve port plate through hole 16 is in communication with at least one back plate through hole 21. FIG. 8 shows a section of flapper control valve 10 in a closed position where back plate 20 abuts ring flapper 18 and ring flapper 18 abuts valve port plate 15 to close the communication between valve port plate through hole 16 and back plate through hole 21.

Pin 17 has a back plate pin portion slidably mounted within back plate 20. Pin 17 has a valve port pin portion sealably secured to ring flapper 18. It is apparent that pin 17 can sealably secure to ring flapper 18 by having a welded connection, by having pin 17 and ring flapper 18 one molded piece as shown in FIG. 8, by having a screwed connection or the like.

In one embodiment of this invention, ring flapper 18 has a diameter greater than the diameter of valve port plate through hole 16. Ring flapper 18 and valve port plate through hole 16 can have any mating cross-sectional shape which provides a proper seat and seal, preferably ring flapper 18 and valve port plate through hole 16 have a circular cross-sectional shape. In an open position of back plate 20 relative to valve port plate 15, ring flapper 18 and pin 17 move in a downstream direction allowing fluid to flow from outside valve housing 11, through valve port plate through hole 16, through back plate through hole 21 and into the chamber formed within valve housing 11. When back plate 20 moves upstream into a closed position relative to the direction of flow as shown by the arrows in FIG. 1, the upstream face of back plate 20 abuts the downstream side of ring flapper 18 thereby seating the upstream side of ring flapper 18 against the downstream side of valve port plate 15. In such closed position of back plate 20, ring flapper 18 seats against valve port plate 15 and seals valve port plate through hole 16 thus allowing no fluid to flow into the chamber formed by valve housing 11.

In a preferred embodiment of this invention, control rod 26 is secured to valve port plate 15. FIG. 1 shows control rod 26 having control rod end shoulder 27 abutting the upstream side of back plate 20. Control rod 26 extends through back plate 20 and a nut mates with a threaded end of control rod 26 on the downstream side of back plate 20. Tightening the nut draws control rod 26 tightly against back plate 20. It is apparent that control rod 26 can be secured to back plate 20 by using other secured connections such as a welded connection, a screwed connection, adhesive connection, or the like.

Valve port plate bushing 24 seats within back plate 20. A downstream side of limiting spacer 25 abuts the upstream side of valve port plate bushing 24. Control rod 26 extends through valve port plate bushing 24 and limiting spacer 25. As shown in FIG. 1, a downstream side of control rod center shoulder 28 abuts the upstream side of limiting spacer 25. Control rod 26 has a shaft portion extending upstream from the upstream side of control rod center shoulder 28 through spring 29, actuator bracket bushing 31 and into solenoid 33. A downstream side of spring 29 abuts the upstream side of control rod center shoulder 28 and an upstream side of spring 29 abuts a downstream side of actuator bracket bushing 31.

As shown in FIG. 1, actuator bracket 30 abuts an upstream side of actuator bracket bushing 31. It is apparent that actuator bracket 30 can abut a downstream side of actuator bracket bushing 31. Actuator bracket 30 is secured to valve port plate 15. It is apparent that actuator bracket 30 can be secured to valve port plate 15 by having a screwed connection, welded or any other suitable connection known to the art. Solenoid 33 is secured to actuator bracket 30. It is apparent that solenoid 33 can be secured to actuator bracket 30 by having a welded connection, screwed connection, or the like. Applying an electric current to solenoid 33, as shown in FIG. 1, horizontally displaces control rod 26 thus opening or closing back plate 20 with respect to valve port plate 15. It is also apparent that solenoid 33 can be replaced by a pneumatically operated bladder having a lever linkage which displaces control rod 26 or by any other type of suitable actuator known to the art which displaces control rod 26.

Figure 3:
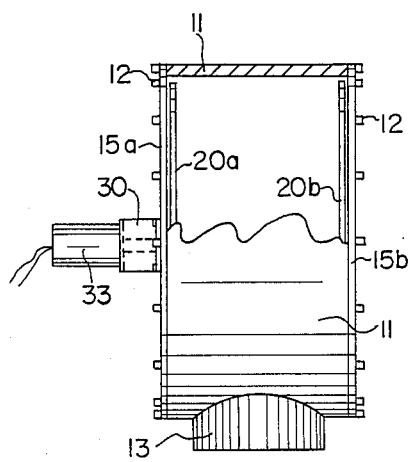
FIG. 3 shows a side view of the flapper control valve as shown in FIG. 2.

FIGS. 2 and 3 show a flapper control valve having two valve port plates 15, two back plates 20 and one inlet fitting 13, such as a fuel inlet fitting, according to one embodiment of this invention. One or more fuel inlet fittings 13 can be sealably secured to valve housing 11 and in communication with the chamber formed by valve housing 11. In the embodiment as shown in FIGS. 2 and 3, the flapper control valve has stepping capabilities which allow valve port plate 15a to open relative to back plate 20a while valve port plate 15b simultaneously closes relative to back plate 20b or allows both valve port plates 15a, 15b to open relative to the respective back plates 20a, 20b. Such stepping capabilities give the flapper control valve, according to this invention, a wide range of input rates, such as fuel input rates, for a given fuel/air ratio by opening one or more valve port plates 15a, 15b relative to the respective back plates 20a, 20b thus admitting a desired quantity of combustion air to mix with the gas or other fuel supply, for example.

Figure 4:
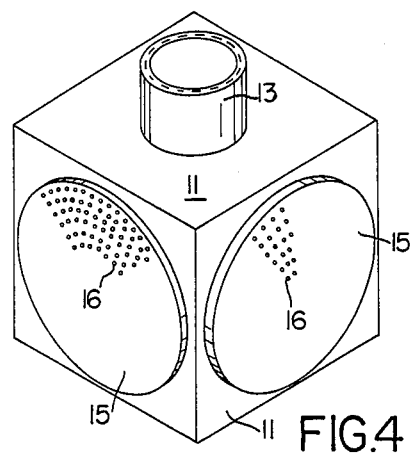
FIG. 4 shows an isometric view of a flapper control valve having a cubic valve housing with five valve port plate assemblies according to one embodiment of this invention.
Figure 5:
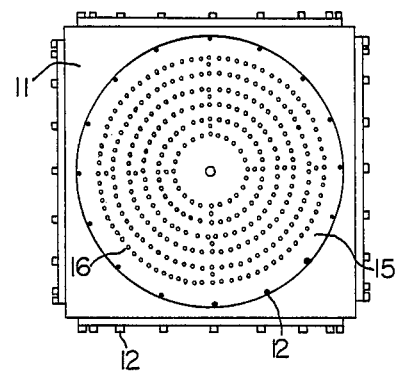
FIG. 5 shows a bottom view of the flapper control valve as shown in FIG. 4.
Figure 6:
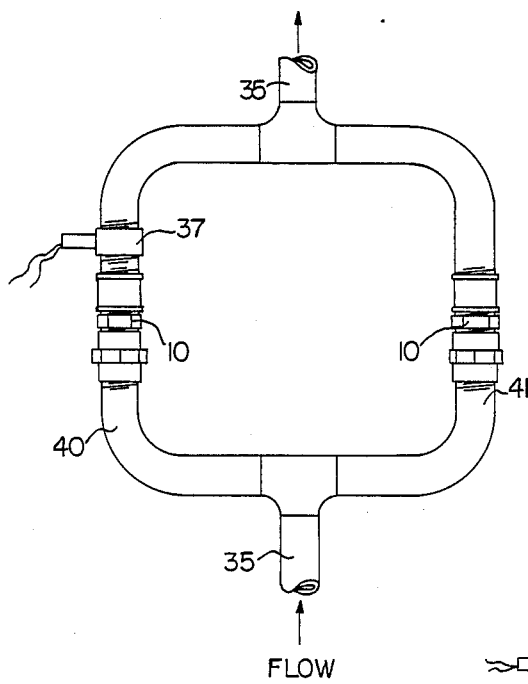
FIG. 6 shows a front view of flapper control valves according to one embodiment of this invention, mounted within a high and low fuel input rate supply system working in tandem with an air intake system (not shown)
Figure 7:
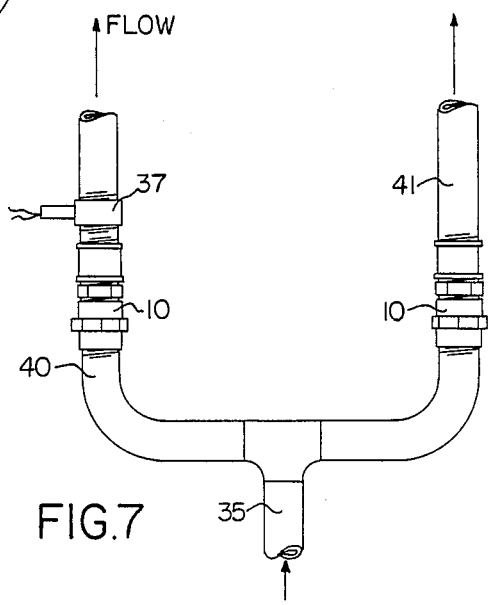
FIG. 7 shows a front view of flapper control valves according to another embodiment of this invention, mounted within a high and low fuel input rate supply system working in tandem with an air intake system (not shown)

FIGS. 4 and 5 show a flapper control valve having five valve port plates 15 which can open and close simultaneously or at different times relative to the respective five back plates 20. FIG. 5 shows a bottom view of the flapper control valve 10 as shown in FIG. 4. FIGS. 6 and 7 show two flapper control valves 10 mounted in a fuel supply system that works in tandem with an air intake system (not shown in FIGS. 6 and 7). The fuel supply system has two input rates, high and low, which are proportional to the air intake system input rates. FIG. 6 shows fuel being directed to a combustion chamber through one orifice located in the downstream section of fuel supply line 35, before a combustion chamber. Both branches 40, 41 of fuel supply line 35 are manifolded downstream before entering the combustion chamber. FIG. 7 shows fuel supply line 35 having two branches through which fuel flows to a combustion chamber, each branch having an orifice located downstream within each branch, before the combustion chamber. An electronic signal used to activate solenoid valve 33 of an air intake system (not shown in FIGS. 6 and 7) is also used to activate solenoid valve 37 of the gas supply lines thus simultaneously bringing both fuel and combustion air supply instantaneously into a new balance at either reduced or increased levels.

Solenoid valve 37 can be a conventional solenoid snap-acting valve or any other suitable snap-acting valve familiar to the art. Solenoid valve 37 operates with flapper control valve 10 located within branch line 40, as shown in FIGS. 6 and 7, to selectively block flow of fuel gas in branch line 40. While FIGS. 6 and 7 show a two fuel input system, it is apparent that more than two fuel input rates can be achieved by increasing both the number of solenoid controlled air flapper control valves 10 and/or the number of fuel input control legs. In a two fuel input system, branch line 41 does not contain solenoid valve 37, while branch line 40 does contain solenoid valve 37. With solenoid valve 37 closed, the two fuel input system has a low fuel flow rate and with solenoid valve 37 open, the two fuel input system has a higher or increased fuel flow rate. Thus, flow rates to the combustion chamber can be varied while maintaining the air/fuel ratio constant.

Depending upon the particular application, the valve parts of this invention can be made from stainless steel, carbon steel, plastic resins, or any other appropriate material familiar to the art.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A one-directional flapper control valve comprising: a valve housing having at least one inlet fitting and at least one flat side, at least one valve port plate sealably secured to said at least one flat side of said valve housing, each said valve port plate having at least one valve port plate through hole;

at least one back plate, each said back plate having at least one back plate through hole, said back plate mounted in an open position relative to and at a distance from said valve port plate, in said open position said at least one valve port plate through hole in communication with said at least one back plate through hole; and closing means for closing a gap between said back plate and said valve port plate thereby sealing the communication between said at least one valve port plate through hole and said at least one back plate through hole, said closing means further comprising a plurality of ring flappers mounted between each said valve port plate and a corresponding said back plate, in a closed position of said back plate with respect to said valve port plate each said ring flapper seating against and between said valve port plate and said back plate closing communication between each said back plate through hole and each said valve port plate through hole, solenoid means and control means for switching the flapper control valve between said open position and said closed position.

2. A one-directional flapper control valve according to claim 1 wherein said valve housing forms a polyhedron.

3. A one-directional flapper control valve comprising: a valve housing having at least one inlet fitting and at least one flat side, at least one valve port plate sealably secured to said at least one flat side of said valve housing, each said valve port plate having at least one valve port plate through hole;
  at least one back plate, each said back plate having at least one back plate through hole, said back plate mounted in an open position relative to and at a distance from said valve port plate, in said open position said at least one valve port plate through hole in communication with said at least one back plate through hole;
  closing means for closing a gap between said back plate and said valve port plate thereby sealing the communication between said at least one valve port plate through hole and said at least one back plate through hole; and
  said closing means further comprises: a plurality of pins, a plurality of ring flappers, each said pin having a back plate pin portion slidably mounted within said back plate and a valve port pin portion sealably secured to said ring flapper, in said closed position of said back plate with respect to said valve port plate said ring flapper seating against said valve port plate and sealing said valve port plate through hole; and
  a control rod having one end secured to said back plate, activating means for displacing said control rod with respect to said valve port plate and abutting said back plate against said at least one ring flapper, and control means for switching the flapper control valve between said open position and said closed position.

4. A one-directional flapper control valve according to claim 3 wherein said activating means further comprises: a valve port plate bushing seated within said valve port plate, a limiting spacer abutting said valve port plate bushing, said control rod having a control rod center shoulder abutting said limiting spacer, a spring abutting said control rod center shoulder, an actuator bracket bushing abutting said spring, an actuator bracket abutting said actuator bracket bushing, said actuator bracket secured with respect to said valve port plate, and actuator means secured to said actuator bracket.

5. A one-directional flapper control valve according to claim 4 wherein said actuator means is an electromagnetic solenoid.

6. A one-directional flapper control valve according to claim 5 wherein said valve housing forms a polyhedron.

7. In a one-directional flapper control valve of the type having a valve housing, at least one inlet fitting and at least one flat side, the improvement which comprises at least one valve port plate sealably secured to said at least one flat side of said valve housing, each said valve port plate having at least one valve port plate through hole;
  at least one back plate, each said back plate having at least one back plate through hole, said back plate mounted in an open position relative to and at a distance from said valve port plate, in said open position said at least one valve port plate through hole in communication with said at least one back plate through hole; and
  closing means for closing a gap between said back plate and said valve port plate thereby sealing the communication between said at least one valve port plate through hole and said at least one back plate through hole, said closing means further comprising a plurality of ring flappers mounted between each said valve port plate and a corresponding said back plate, in a closed position of said back plate with respect to said valve port plate each said ring flapper seating against and between said valve port plate and said back plate closing communication between each said back plate through hole and each said valve port plate through hole, solenoid means and control means for switching the flapper control valve between said open position and said closed position.

8. In a one-directional flapper control valve of the type having a valve housing, at least one inlet fitting and at least one flat side, the improvement which comprises at least one valve port plate sealably secured to said at least one flat side of said valve housing, each said valve port plate having at least one valve port plate through hole;
  at least one back plate, each said back plate having at least one back plate through hole, said back plate mounted in an open position relative to and at a distance from said valve port plate, in said open position said at least one valve port plate through hole in communication with said at least one back plate through hole; and
  said closing means further comprises: a plurality of pins, a plurality of ring flappers, each said pin having a back plate pin portion slidably mounted within said back plate and a valve port pin portion sealably secured to said ring flapper, in said closed position of said back plate with respect to said valve port plate said ring flapper seating against said valve port plate and sealing said valve port plate through hole; and
  a control rod having one end secured to said back plate, activating means for displacing said control rod with respect to said valve port plate and abutting said back plate against said at least one ring flapper, and control means for switching the flapper control valve between said open position and said closed position.

9. An improved one-directional flapper control valve according to claim 8 wherein said activating means further comprises: a valve port plate bushing seated within said valve port plate, a limiting spacer abutting said valve port plate bushing, said control rod having a control rod center shoulder abutting said limiting spacer, a spring abutting said control rod center shoulder, an actuator bracket bushing abutting said spring, an actuator bracket abutting said actuator bracket bushing, said actuator bracket secured with respect to said valve port plate, and actuator means secured to said actuator bracket.

10. An improved one-directional flapper control valve according to claim 9 wherein said actuator means is an electromagnetic solenoid.

* * * * *